M. CASHMORE.
PROPORTION CALCULATOR.
APPLICATION FILED DEC. 31, 1914.
1,163,392.
Patented Dec. 7, 1915.
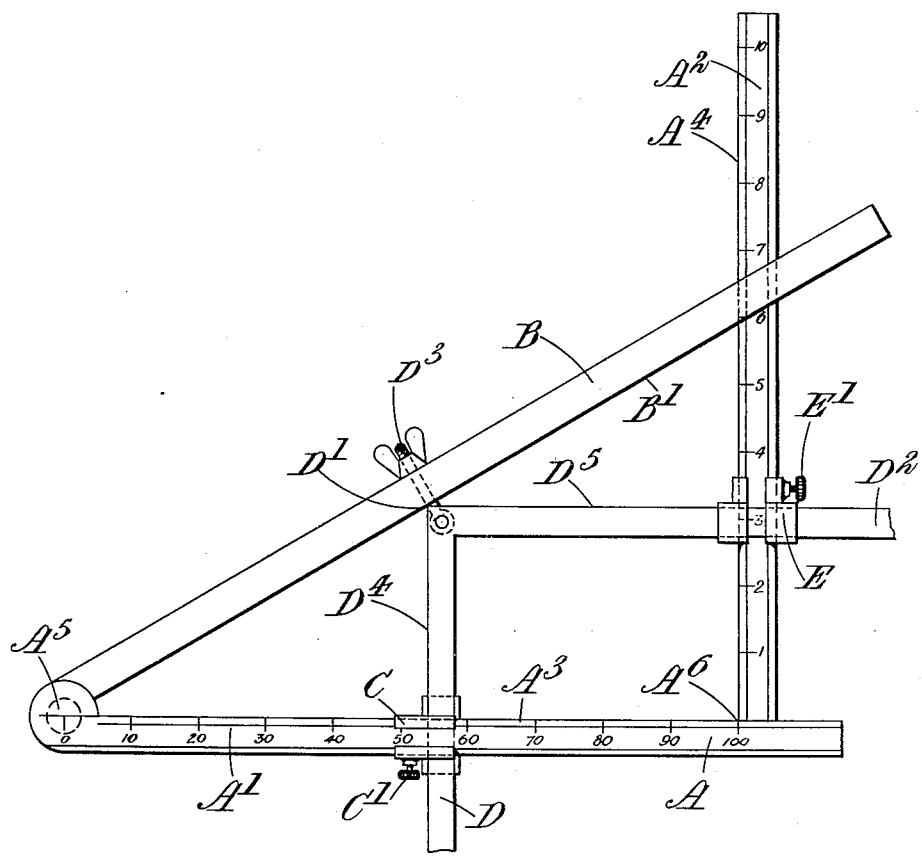

UNITED STATES PATENT OFFICE.

MONTAGUE CASHMORE, OF LONDON, ENGLAND.

PROPORTION-CALCULATOR.

1,163,392. Specification of Letters Patent. Patented Dec. 7, 1915.

Application filed December 31, 1914. Serial No. 879,898.

*To all whom it may concern:*

Be it known that I, MONTAGUE CASHMORE, a subject of the King of England, residing at Maida Vale, London, England, have invented certain new and useful Improvements in Proportion-Calculators, of which the following is a specification.

This invention relates to proportion calculators in which a two-armed member or its equivalent providing an angle (conveniently a right angle) between the arms is employed, one of which arms is a straight guide, a movable member is pivoted by one end to the guide-arm or its equivalent so that its other end can swing along the other arm, a strut-member is provided which can be adjusted along a guide-arm whence it projects across the pivoted member and has a scale to indicate how far this member is moved from the arm to which it is pivoted, the said strut-member having moreover a constant angular relation to the said guide-arm, a scale is provided on the guide-arm to indicate how far the strut-member is moved along it and a further scale is provided on the arm swept by the pivoted member so that after the strut-member has been set along one arm to a position indicating one term of a proportion stated, and the pivoted member has been moved along the strut-member to a position indicating the second term of the proportion stated, the fourth term can be read off from the scale on the other arm swept by the movable member.

The object of my invention is to provide a proportion calculator having a strut-member which has a sliding movement relatively to the direction of length of one arm of a two-armed member and also sliding movement in a direction transverse to the arm in whose direction of length it has sliding movement, said strut-member being so arranged as to constitute a positive stop for the pivoted member in one direction, the position of such stopping point varying according to the setting of the strut-member, and the strut-member further having an index or reading edge which coöperates with the same scale as the free end of the movable member so that the one scale will serve to position the strut for one of the terms of the proportion stated and will also indicate the fourth term of such proportion when the strut has been further adjusted for the second term of the proportion stated.

Preferably the strut-member is permanently mounted on its guide-arm so that it slides along the same and maintains a constant angle thereto, and the pivoted member is provided with a straight guide portion which abuts against the strut-member.

The accompanying drawing illustrates diagrammatically one method of carrying out this invention.

A two-armed member A is employed providing a right angle between the said arms. For convenience one arm $A^1$ may be termed the horizontal arm and the other arm $A^2$ may be termed the vertical arm. These are provided respectively with graduated edges or scales $A^3$, $A^4$. On the arm $A^1$ at a point $A^5$ in line with the inner edge of the same, is pivoted a movable member B. This may be termed the hypotenuse member and it extends across to the vertical arm $A^2$ and has a lower or inner edge $B^1$ in line with the pivot $A^5$, the position of which can be read off against the graduations of the scale $A^4$. The horizontal arm $A^1$ is machined to provide a straight sliding surface for a block C carried thereon in any convenient manner. A strut-member D slides in the block C in a direction at right angles to the arm $A^1$ and parallel to the arm $A^2$. The end of one edge $D^4$ of the "strut" contacts at $D^1$ with the edge $B^1$ of the "hypotenuse" member B. The strut has a right-angled extension $D^2$ having an upper edge $D^5$ in line with the point $D^1$. This extension slides through a block E free to slide on the vertical arm $A^2$ which is also machined for this purpose. Thumb-screws $C^1$ and $E^1$ are provided to clamp the blocks C and E in any desired position upon their respective arms, and if desired a bolt $D^3$ sliding in a slot in the member B may also be provided to clamp the member D to the "hypotenuse" member B. The graduations along the horizontal edge $A^3$ commence at zero at the point $A^5$ and between this point and the point $A^6$ where the edges $A^3$ and $A^4$ intersect, the graduations have some number of parts which affords easy manipulation in calculation, say, for example, one hundred.

In using the device, the graduations of the scale $A^3$ are used to indicate one term of the proportion stated, by setting the vertical edge $D^4$ of the member D thereto. The graduations on the vertical edge $A^4$ are used to represent the second term of the proportion by setting the upper edge $D^5$ of the extension $D^2$ at the graduation corresponding to the desired second term. If the "hypotenuse" member is then made to bear upon the point D¹, its point of intersection with the scale A⁴ will indicate the fourth term of the proportion. The total number 100 of the graduations on the edge A³ is the third term of the proportion. Thus if it is required to know the proportion of the cost of labor as compared with the total cost of production of any article, the block C can be set to a number of units from zero representing the total cost, and the "strut" D run out away from the arm A¹, until the block E is brought into a position representing on the scale A⁴ the cost of labor. If the "hypotenuse" member B is made to bear on the "strut" at D¹, the edge B¹ will be found to intersect the edge A⁴ at a point which will indicate the proportion required. The reading of the edge B¹ on the scale A⁴ will, of course, need to be taken in its proper relation to the scale on the horizontal arm. Thus, if as shown there are one hundred units between the points A⁵ and A⁶ on the edge A³, the units on the scale A⁴ will, when read against the edge B¹, represent hundredths in the required answer and may be read as percentages.

The clamping screws C¹ and E¹ are used to fix the blocks C and E in any adjusted position and are useful particularly when one of the first two terms of the proportion stated is a fixed quantity, and a series of results are required to be obtained with various values of the other term. The free end of the "hypotenuse" member B may be provided with means (not shown) for clamping it to the vertical arm A². This last clamping means is serviceable where the use of the instrument is reversed and it is desired to start operations with a given percentage as constituting one of the terms of the proportion whereof another term is to be found. Thus, if goods are bought at a certain price and it is desired to put a certain percentage of profit on them, the "strut" D may be adjusted along the scale A³ to a position representing the price of the goods, and the "hypotenuse" member B may be clamped to the arm A² at the position representing the percentage of profit required, and then when the "strut" is run out through the block C until it contacts with the edge B¹ of the "hypotenuse", the selling price can be read off on the scale A⁴.

Obviously the device can be varied in the details of manufacture. For example, one of the limbs of the strut-member D⁴ instead of being passed through the block C could be made to merely lie across the arm A¹ of the two-armed member A to serve as an index thereon.

It will be understood that "hypotenuse" is used throughout the specification to indicate the member providing the third side of the triangle formed by the edges A³, A⁴, B¹, whether this is a right-angled triangle or not.

What I claim as my invention and desire to secure by Letters Patent is:—

1. In a proportion calculator the combination of a straight guide, a second straight guide pivoted to move relatively to the first, a strut-member which lies across one straight guide and abuts against the guiding portion of and forms a positive stop for the other straight guide to limit its movement in one direction, means for adjusting the strut-member along its guide while maintaining it at a constant angle to the said guide, means for sliding the strut-member across its guide in such direction as to cause it to project a greater or less distance therefrom, a scale portion to indicate the position of the strut-member along its guide, a scale to indicate the amount it projects from the guide, and a scale-portion positioned to serve as an index to the pivoted guide, for the purpose described.

2. In a proportion calculator the combination of, a straight guide, a second straight guide pivoted to move relatively to the first, a strut-member which projects laterally from one straight guide and abuts against the guiding portion of and forms a positive stop for the other straight guide to limit its movement in one direction, means for adjusting the strut-member along its guide while maintaining it at a constant angle to the said guide, means for sliding the strut-member across its guide in such direction as to cause it to project a greater or less distance therefrom, a scale to indicate the position of the strut-member along its guide, and a second scale parallel to the transverse sliding movement of the strut which latter is provided with a reading edge lying across the second scale parallel to the guide along which the strut slides to indicate on this scale in all positions of the strut the amount which the strut projects from its guide, the pivoted guide being also provided with a reading edge which coöperates with the said second scale so that the one scale can be employed for one of the settings of the strut and to read off the result indicated by the pivoted guide.

3. In a proportion calculator, the combination of, a two-armed member providing an angle between the arms and whereof one arm is a straight guide, a second straight guide pivoted to one of the arms so that its free end can swing along the other arm, a strut-member which lies across the straight guide-arm and arranged to slide across the same in a path parallel to the other arm and abut against the guiding portion of and form a positive stop for the pivoted straight guide, means for adjusting the strut-member along its guide while maintaining the said strut-member at a constant angle to the said guide, a scale on the arm along which the free end of the pivoted straight guide sweeps, the strut-member moreover having an index-portion which reads on said scale to indicate how far it projects from its guide and a scale for indicating how far the strut-member is moved along its guide, for the purpose described.

4. In a proportion calculator, the combination of, a two-armed member whose arms provide an angle between them each arm forming a straight guide, a third straight guide pivoted at one end to one of the said arms so that the free end of the movable guide can move along the arm to which it is not pivoted, a strut-member comprising two arms which are parallel to the two straight guide-arms and cross the same root of the two arms being made to abut against the guiding portion of the pivoted guide to form a positive stop therefor when moved in one direction, means for slidingly connecting the two arms of the strut-member with the two straight guide-arms so that the strut-member can slide both along and across either arm without changing its angular position relatively to the arms, a scale on the arm to which the movable member is pivoted, and a scale on the other arm which serves the double purpose of reading against the strut and the free end of the said movable arm, for the purpose described.

In testimony whereof I have signed my name to this specification in the presence of two subscribing witnesses.

MONTAGUE CASHMORE.

Witnesses:
 HARRY B. BRIDGES,
 STANLEY R. MOORE.